(No Model.)
W. BOWERS.
CABLE CROSSING.
No. 488,262. Patented Dec. 20, 1892.
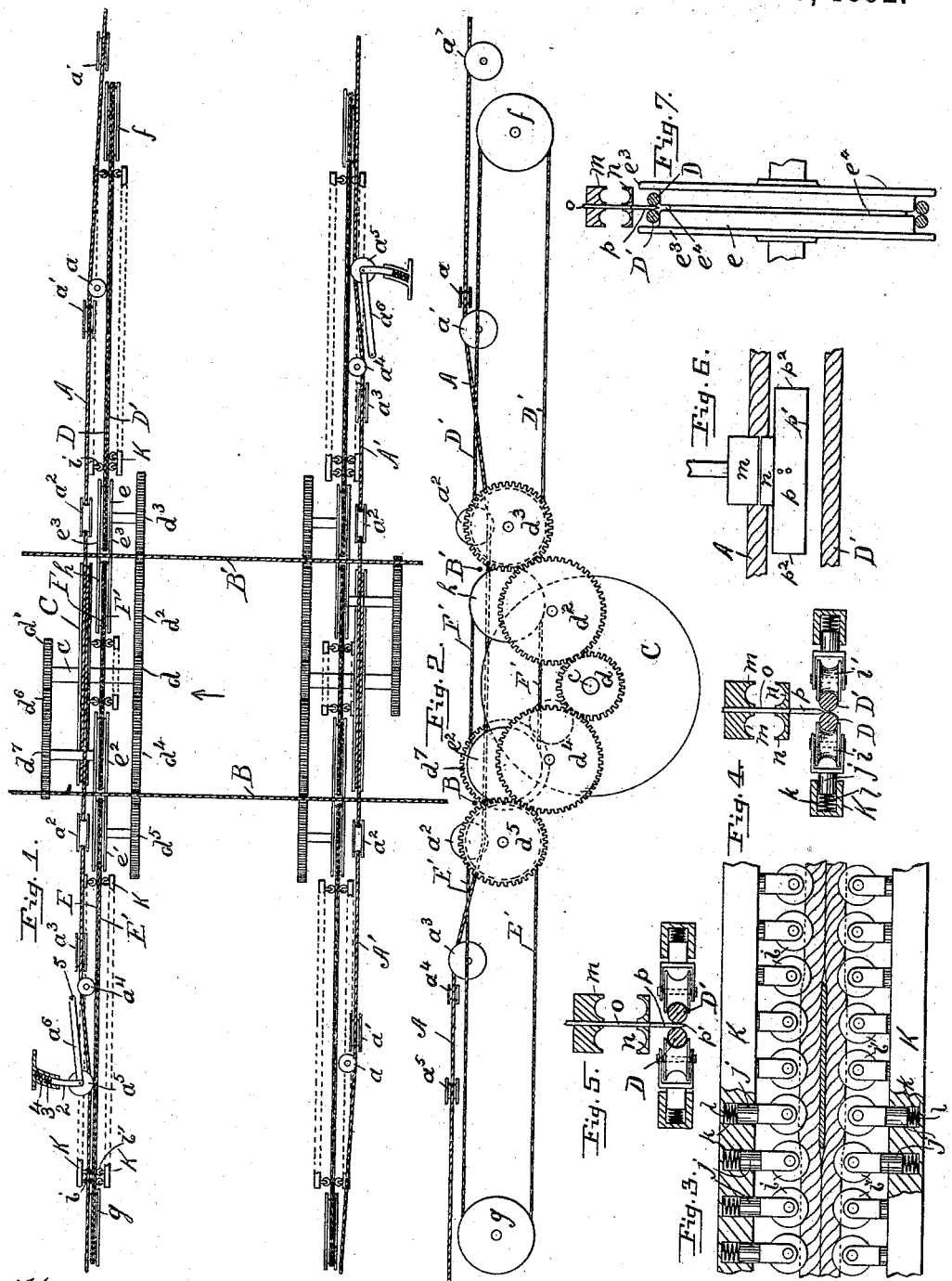
Witnesses:
Inventor:—
William Bowers
by Walter Brown
his Attorney

UNITED STATES PATENT OFFICE.

WILLIAM BOWERS, OF NEW YORK, N. Y., ASSIGNOR OF ONE-HALF TO CHARLES M. WOOLCOTT, OF SAME PLACE.

CABLE-CROSSING.

SPECIFICATION forming part of Letters Patent No. 488,262, dated December 20, 1892.

Application filed June 22, 1892. Serial No. 437,672. (No model.)

*To all whom it may concern:*

Be it known that I, WILLIAM BOWERS, a citizen of the United States, and a resident of the city of New York, in the county and State of New York, have invented a certain new and useful Improvement in Cable-Crossings, of which the following is a specification.

My invention relates to improvements in cable crossings, that is apparatus for enabling a cable-propelled car which is traveling on one street to cross the cables of an intersecting street line without interruption. Heretofore, in apparatus designed for that purpose, the momentum of the car at the time of reaching the crossing has been relied on to carry it over the intersecting cable. But the conditions of service may have required the car to stop just before crossing, so that it has no momentum, and horse or man-power is often necessary to pull or push the car across the intersecting street. My invention, however, provides for continuous application of power to the car, derived from the main cable itself, while crossing, so that the motion of the car is uninterrupted.

Essentially my invention consists in auxiliary cables, propelled from the main cable, which take the car just at the instant it is released from the main cable, and carry it forward, and these auxiliary cables so arranged with reference to the main cable, that the freeing of the grip from the main cable causes the auxiliary cables to engage at the same instant with the grip, and so maintain a continuous force on the car.

In carrying out this invention I have also devised means of converting the auxiliary cables into a grip, the cables themselves becoming the clamping device. My invention therefore also includes the devices for producing this operation of the auxiliary cables, and the modification of the grip which enables the cables to clamp it.

Referring to the drawings which accompany the specification to aid the description. Figure 1 is a plan view of two sets of main cables traveling in opposite directions, and the auxiliary cables for each of the crossing cables. Fig. 2 is a side elevation of one main cable, its auxiliary cables and the operating mechanism for the same. Fig. 3 is a plan much enlarged of a portion of the auxiliary cables clamping the plate of the cable grip of a car. Figs. 4 and 5 are details showing how the auxiliary cables are clamped against the plate of the grip. The grip is partly broken. Fig. 6 is a side elevation of the grip and plate, with parts of the main and auxiliary cable. Fig. 7 is a detail much enlarged of a guide sheave of the auxiliary cables, showing the cables in section and the plate clamped between them.

A, A', are two main cables usually placed in a cable conduit below the street level, said conduit not being shown in the drawings since it is a well known construction, one cable at either side of a street, traveling in opposite directions and crossing the cables, B, B'.

My device is to provide for a car on either A or A', crossing B and B', and since the apparatus in connection with both A and A', is the same, but simply reversed in order, I shall hereinafter describe only that in connection with cable A. Some distance before arriving at the crossing the said cable A is deflected somewhat laterally from its right line direction so as to clear the plane of the auxiliary cables which continue in that line, and is carried by guide sheaves $a$, and above other usual sheaves, $a'$, $a'$, and under sheaves, $a^2$, so as to pass under the cables B, B', and below the auxiliary cables, to some point beyond the crossing, where it passes over a sheave, $a^3$, by a sheave, $a^4$, and then turns in gradually again to its original right line. Between sheave $a^4$ and that right line the cable A, passes by a spring actuated sheave, $a^5$, carried on the end of a lever, $a^6$, as will be hereinafter more fully explained. Between the cables B, B', the aforesaid cable, A, is carried as often as necessary, (usually twice) around a large drum, C, or drums which are fixed on a shaft, $c$, and carries gears, $d$, $d'$. Said shaft will be supported in bearings in any suitable frame set in the cable conduit, neither the frame nor the conduit being shown since they are well known constructions. Said gear, $d$, meshes with trains, $d^2$, $d^3$, and $d^4$, $d^5$, respectively and said gear, $d'$, meshes with a train, $d^6$, $d^7$. Evidently the peripheral speed of all these gears will be the same and equal to the peripheral speed of the gear, $d'$, and in the same direction. Gears, $d^3$, $d^5$, and $d^7$ are each fixed on a shaft carrying a cable drum or sheave, $e$, $e'$, $e^2$, all in the same straight line and a little above the cables, B, B', (Fig. 2) and which have a periphery between the flanges $e^3$, more than wide enough for two auxiliary cables to lie side by side. In the middle of said periphery is the groove, $e^4$, to admit the edge of the clamping plate as will be hereinafter described. Two endless auxiliary cables, D, D', are stretched over said sheave, $e$, and a similar sheave, $f$, near the point when the cable, A, begins to deflect with one or more turns around the sheaves as necessary; two other auxiliary cables, E, E', are stretched in the same manner over the sheave, $e'$, and another similar sheave, $g$, near the point where the cable, A, returns to its original line, and two other auxiliary cables, F, F', are stretched between the inner ends of the first sets, over the sheave, $e^2$, and another similar sheave, $h$, all three sets of auxiliary cables being in the original line of the main cable, and a little below the said main cable, except between the aforesaid sheaves, $a^2$, $a^2$. All said auxiliary cables, D, D', E, E', F, F', will travel in the same direction as the main cable A. Along outside each set of said auxiliary cables from end to end are a series of tension rolls, $i$, $i'$, which press the two auxiliary cables of each set together, (Fig. 3). Said rolls, $i$, $i'$, are grooved sheaves rotating in the split ends of short horizontal rods, $j'$, which are housed in cylindrical sockets, $k$, in socket bars, K, said socket bars, K, being long bars of metal secured horizontally in any suitable manner in the cable conduit to either side of each pair of auxiliary cables, and having the sockets, $k$, bored at frequent intervals. In the bottom of these sockets are springs, $l$, tending to force out the rods, $j'$, and thereby press the two cables together. In place of the springs, $l$, I might use any other device which would put tension on the rods, $j'$.

The main cable grip is for the most part of any ordinary description, and usually consists as seen in Figs. 4 and 5, of fixed upper jaws, $m$, $m$, and movable lower jaws, $n$, $n$, which latter are bolted on the stem, $o$, leading down from the brakeman's lever, not shown, and passing freely down through a slot in said upper jaws, $m$, $m$. I have devised the addition to the usual brake shown in Figs. 5 and 6, and which is a rather long, rectangular plate, $p$, bolted horizontally on the stem, $o$, below the jaws, $n$, $n$, and having its lower edge, $p'$, and its vertical edges, $p^2$, $p^2$, beveled like knife edges. Said plate, $p$, is just wide enough so that when the grip is released from the main cable A, by lowering the stem, $o$, said plate will descend down between the pair of auxiliary cables, and be clamped between them as seen in Fig. 5. In case the plate, $p$, is pushed down a little farther than necessary, the groove, $e^4$, in the sheaves $e$, $e'$, $e^2$, allows its lower edge to enter freely without interfering with the motion of the sheave.

The sheaves, $f$, $g$, $h$, also each have a similar groove and for the same purpose. As before said, near the point where the cable A, returns to its original line, is the spring-actuated sheave, $a^5$. Said sheave is carried at the free end of the lever $a^6$, which is pivoted at 5 to any convenient part of the supports, not shown, and the free end of said lever has a lateral guide rod, 2, curved on an arc struck from 5 as a center, which rod reciprocates in a socket, 3, being normally forced outward by the spring, 4, as seen in Fig. 1. When a car is not passing, said sleeve, $a^5$, pushes the cable, A, over toward the auxiliary cables, but as a car passes in the direction of the arrow, the grip pushes the sheave, $a^5$, aside so that it can pass by, the spring 4 immediately returning the sheave to its first position when the car has passed.

The operation is as follows:—Suppose a car coming toward the crossing propelled by the cable, A, its grip will have hold of said cable, and the plate, $p$, will be above the auxiliary cables. When the car comes above the sheave, $f$, the grip-man warned by a sign on the street, will push down the jaw, $n$, releasing cable, A, and at the same instant pushing the plate, $p$, between the auxiliary cables, D, D', (Figs. 4, 5 and 6). The auxiliary cables will now propel the car to the sheave, $e$, and the plate, $p$, being long will bridge the interval between the sheaves, $e$, $h$, and its front end will enter the cables, F, F', before its rear part leaves the cables, D, D', so that the car continues across over the cables, B, B', without interruption, and in a similar manner the plate, $p$, engages the cables, E, E', before it leaves cables, F, F', and the car continues on toward the sheave, $a^5$, passing that as described, and the cable, A, now entering the wide open jaw of the grip. When the car has come over sheave, $g$, the gripman warned as before, closes the grip on the main cable, A, thus withdrawing the plate, $p$, from the auxiliary cables, E, E, and the car proceeds on its way. Should it be necessary to stop the car on any part of the crossing the plate, $p$, can be withdrawn from between the auxiliary cables and brakes applied in the usual manner.

Evidently the apparatus is as well adapted to switching as to street crossing, being applicable wherever one cable line crosses or intersects another.

Now having described my improvement I claim as my invention,

1. A cable-crossing consisting of auxiliary clamping cables traveling in the direction of the main crossing cable.

2. A cable-crossing consisting of auxiliary cables arranged in pairs tensionally pressed together, and traveling in the direction of the main crossing.

3. A cable-crossing consisting of three sets of auxiliary cables arranged in pairs tensionally pressed together, one set approaching the crossing, another set between the crossed cables, and the third set receding from the crossing, and all traveling in the same direction as the main crossing cable.

4. A cable-crossing consisting of auxiliary cables arranged in pairs and traveling in the same direction as the main crossing cable, and tensional rolls along the length of said auxiliary cables and pressing the cables of the pair together.

5. A cable-crossing consisting of a drum actuated by the main crossing cable, a sheave actuated from said drum and propelling a pair of auxiliary cables in the same direction as the main crossing cable, and tensional rolls along the length of the auxiliary cables, pressing the said cables together.

6. A cable-crossing consisting of a laterally and vertically deflected length of the main crossing cable, and auxiliary cables in the main line direction of the said main crossing cable, arranged in pairs tensionally pressed together, and traveling in the same direction as the said main crossing cable.

7. In combination with the auxiliary cables in pairs, as described, a grip having a plate and adopted to enter between the auxiliary cables.

8. In a cable-crossing apparatus, and in combination with auxiliary cables arranged in pairs, tension sheaves to press said cables together, set rotatably on rods reciprocating in housings which contain springs actuating said rods.

9. A cable crossing consisting of one or more sets of auxiliary cables, arranged in pairs tensionally pressed together, and all traveling in the same direction as the main cable.

In testimony that I claim the foregoing as my invention I have signed my name, in presence of two witnesses, this 17th day of June, 1892.

WILLIAM BOWERS.

Witnesses:
WILLIAM G. FINLEY,
ARTHUR L. KENT.